US009326146B2

(12) United States Patent
Bradley

(10) Patent No.: US 9,326,146 B2
(45) Date of Patent: Apr. 26, 2016

(54) METHOD FOR DOWNLOADING A SUBSCRIPTION IN AN UICC EMBEDDED IN A TERMINAL

(75) Inventor: Paul Bradley, Austin, TX (US)

(73) Assignee: GEMALTO INC., Austin, TX (US)

( * ) Notice: Subject to any disclaimer, the term of this patent is extended or adjusted under 35 U.S.C. 154(b) by 0 days.

(21) Appl. No.: 13/991,744

(22) PCT Filed: Dec. 2, 2011

(86) PCT No.: PCT/EP2011/071674
§ 371 (c)(1),
(2), (4) Date: Oct. 10, 2013

(87) PCT Pub. No.: WO2012/076424
PCT Pub. Date: Jun. 14, 2012

(65) Prior Publication Data
US 2014/0024343 A1 Jan. 23, 2014

(30) Foreign Application Priority Data

Dec. 6, 2010 (EP) .................................. 10306359

(51) Int. Cl.
| H04W 8/20 | (2009.01) |
| H04W 12/08 | (2009.01) |
| H04W 4/00 | (2009.01) |
| H04W 12/04 | (2009.01) |
| H04W 12/06 | (2009.01) |
| H04L 29/08 | (2006.01) |
| H04L 9/08 | (2006.01) |
| H04W 8/22 | (2009.01) |
| H04B 1/3816 | (2015.01) |
| H04W 8/18 | (2009.01) |
| H04L 29/06 | (2006.01) |
| H04W 84/04 | (2009.01) |

(52) U.S. Cl.
CPC ............ *H04W 12/08* (2013.01); *H04B 1/3816* (2013.01); *H04L 9/0825* (2013.01); *H04L 63/0428* (2013.01); *H04L 63/123* (2013.01); *H04L 67/34* (2013.01); *H04W 4/001* (2013.01); *H04W 4/003* (2013.01); *H04W 4/005* (2013.01); *H04W 8/183* (2013.01); *H04W 8/22* (2013.01); *H04W 12/04* (2013.01); *H04W 12/06* (2013.01); *H04L 63/083* (2013.01); *H04W 8/18* (2013.01); *H04W 8/205* (2013.01); *H04W 84/04* (2013.01)

(58) Field of Classification Search
CPC ........... H04W 8/18; H04W 8/20; H04W 8/26; H04W 92/08
USPC ................................................. 455/411, 558
See application file for complete search history.

(56) References Cited

U.S. PATENT DOCUMENTS

| 6,978,152 | B1 | 12/2005 | Yamaashi et al. |
| 7,024,390 | B1 | 4/2006 | Mori et al. |
| 7,146,161 | B2 | 12/2006 | Chou |
| 7,349,719 | B2 | 3/2008 | Buniatyan |
| 7,363,056 | B2 | 4/2008 | Faisy |
| 2002/0186845 | A1 | 12/2002 | Dutta et al. |
| 2004/0131186 | A1 | 7/2004 | Kasuya et al. |
| 2004/0235523 | A1 | 11/2004 | Schrire et al. |
| 2005/0021875 | A1 | 1/2005 | Bouthemy et al. |
| 2005/0164737 | A1* | 7/2005 | Brown .......................... 455/558 |
| 2005/0186954 | A1 | 8/2005 | Kenney |
| 2005/0239504 | A1 | 10/2005 | Ishii et al. |
| 2005/0266883 | A1 | 12/2005 | Chatrath |
| 2006/0049243 | A1 | 3/2006 | Sakamura et al. |
| 2006/0079284 | A1 | 4/2006 | Lu et al. |
| 2006/0086785 | A1 | 4/2006 | Sakata |
| 2006/0196931 | A1 | 9/2006 | Holtmanns et al. |
| 2006/0199614 | A1 | 9/2006 | Hyacinthe |
| 2007/0105532 | A1 | 5/2007 | Martin et al. |
| 2007/0239857 | A1 | 10/2007 | Mahalal et al. |
| 2008/0090614 | A1 | 4/2008 | Sicher et al. |
| 2008/0130879 | A1 | 6/2008 | Heinonen et al. |
| 2008/0261561 | A1 | 10/2008 | Gehrmann |
| 2008/0292074 | A1 | 11/2008 | Boni et al. |
| 2008/0319823 | A1 | 12/2008 | Ahn et al. |
| 2009/0159692 | A1 | 6/2009 | Chew et al. |
| 2009/0163175 | A1 | 6/2009 | Shi et al. |
| 2009/0191857 | A1 | 7/2009 | Horn et al. |
| 2009/0191917 | A1 | 7/2009 | Zappulla et al. |

(Continued)

FOREIGN PATENT DOCUMENTS

| CN | 101080051 A | 11/2007 |
| CN | 101179401 A | 5/2008 |

(Continued)

OTHER PUBLICATIONS

Partial European Search Report issued on Jul. 22, 2011, by the European Patent Office in the European Application No. 10 30 6359. (7 pages).
International Search Report (Form PCT/ISA/210) and the Written Opinion of the International Searching Authority (Form PCT/ISA/237) issued on Feb. 27, 2012, by the European Patent Office in the International Application No. PCT/EP2011/071660. (6 pages).
International Search Report (Form PCT/ISA/210) and the Written Opinion of the International Searching Authority (Form PCT/ISA/237) issued on Mar. 28, 2012, by the European Patent Office in the (Continued)

*Primary Examiner* — Christopher M Brandt
(74) *Attorney, Agent, or Firm* — Buchanan Ingersoll & Rooney PC

(57) ABSTRACT

The invention proposes a method for downloading a subscription in an UICC embedded in a terminal, this method consisting in:
  transferring an ICCID to the terminal;
  sending the ICCID over an IP link to a secure vault;
  selecting in the secure vault a subscription corresponding to the ICCID;
  transmitting the subscription to the terminal over the IP link;
  storing the subscription in the terminal.

5 Claims, No Drawings

(56) References Cited

U.S. PATENT DOCUMENTS

| | | |
|---|---|---|
| 2009/0191918 A1 | 7/2009 | Mardiks |
| 2009/0215431 A1 | 8/2009 | Koraichi |
| 2009/0217348 A1 | 8/2009 | Salmela et al. |
| 2009/0307142 A1 | 12/2009 | Mardikar |
| 2010/0179907 A1 | 7/2010 | Atkinson |
| 2011/0028126 A1 | 2/2011 | Lim et al. |
| 2011/0035584 A1* | 2/2011 | Meyerstein et al. ......... 713/155 |
| 2011/0059773 A1 | 3/2011 | Neumann et al. |
| 2011/0126183 A1 | 5/2011 | Bernard et al. |
| 2011/0136482 A1 | 6/2011 | Kaliner |
| 2011/0237190 A1 | 9/2011 | Jolivet |
| 2011/0302641 A1 | 12/2011 | Hald et al. |
| 2011/0320600 A1 | 12/2011 | Froeding et al. |
| 2012/0028609 A1* | 2/2012 | Hruska .......................... 455/411 |
| 2012/0108295 A1 | 5/2012 | Schell et al. |
| 2012/0113865 A1 | 5/2012 | Zhao et al. |
| 2012/0190354 A1 | 7/2012 | Merrien et al. |
| 2012/0297473 A1 | 11/2012 | Case et al. |
| 2013/0318355 A1 | 11/2013 | Girard et al. |
| 2013/0324091 A1 | 12/2013 | Girard et al. |
| 2013/0329683 A1 | 12/2013 | Berard et al. |
| 2014/0019760 A1 | 1/2014 | Vergnes et al. |
| 2014/0031083 A1 | 1/2014 | Vergnes et al. |
| 2014/0057680 A1 | 2/2014 | Proust et al. |
| 2014/0066011 A1 | 3/2014 | Bradley |
| 2014/0122872 A1 | 5/2014 | Merrien et al. |
| 2014/0141747 A1 | 5/2014 | Merrien et al. |

FOREIGN PATENT DOCUMENTS

| | | |
|---|---|---|
| CN | 101309518 A | 11/2008 |
| DE | 10 2008 033 976 A1 | 1/2010 |
| EP | 1 650 717 A1 | 4/2006 |
| EP | 1 965 596 A1 | 9/2008 |
| EP | 2 056 523 A1 | 5/2009 |
| EP | 2 076 071 A1 | 7/2009 |
| FR | 2 871 020 A1 | 12/2005 |
| GB | 2 457 221 A | 8/2009 |
| JP | 2002-236572 A | 8/2002 |
| JP | 2005323128 A | 11/2005 |
| JP | 2006-050554 A | 2/2006 |
| JP | 2006107316 A | 4/2006 |
| JP | 2008-519343 A | 6/2008 |
| JP | 2010-501092 A | 1/2010 |
| JP | 2010-532107 A | 9/2010 |
| JP | 2011525311 A | 9/2011 |
| JP | 2012528534 A | 11/2012 |
| KR | 2002-0066032 A | 8/2002 |
| KR | 2003-0044260 A | 6/2003 |
| KR | 10-0489783 B1 | 5/2005 |
| KR | 10-2005-0095424 A | 9/2005 |
| KR | 2007-0095048 A | 9/2007 |
| KR | 10-2008-0014285 A | 2/2008 |
| KR | 10-2008-0015870 A | 2/2008 |
| KR | 10-2009-0056019 A | 6/2009 |
| KR | 10-2010-0095648 A | 8/2010 |
| KR | 10-2010-011642 A | 10/2010 |
| WO | 02/082715 A1 | 10/2002 |
| WO | 03/104997 A1 | 12/2003 |
| WO | 2004/021296 A1 | 3/2004 |
| WO | 2007/058241 A1 | 5/2007 |
| WO | 2008/128874 A1 | 10/2008 |
| WO | WO 2008/123827 A1 | 10/2008 |
| WO | 2009/055910 A1 | 5/2009 |
| WO | 2009/092115 A2 | 7/2009 |
| WO | 2009091837 A1 | 7/2009 |
| WO | 2009/095295 A1 | 8/2009 |
| WO | WO 2009/103623 A2 | 8/2009 |
| WO | 2009/141024 A1 | 11/2009 |
| WO | 2009141035 A1 | 11/2009 |
| WO | 2009/149788 A2 | 12/2009 |
| WO | 2010/052332 A1 | 5/2010 |
| WO | 2010063016 A3 | 6/2010 |
| WO | 2010138592 A2 | 12/2010 |
| WO | 2011139795 A1 | 11/2011 |
| WO | 2011159549 A1 | 12/2011 |
| WO | 2012012526 A1 | 1/2012 |
| WO | 2012058092 A1 | 5/2012 |
| WO | 2012058099 A1 | 5/2012 |
| WO | 2012058429 A2 | 5/2012 |
| WO | 2012058446 A1 | 5/2012 |
| WO | 2012058450 A1 | 5/2012 |
| WO | 2012061516 A1 | 5/2012 |
| WO | 2012061561 A2 | 5/2012 |
| WO | 2012065112 A2 | 5/2012 |

OTHER PUBLICATIONS

International Application No. PCT/EP2011/071737. (6 pages).
An English Translation of the Office Action (Notice of Reasons for Rejection) issued on Jun. 17, 2014, by the Japan Patent Office in the Japanese Patent Application No. 2013-542492. (3 pages).
International Search Report (Form PCT/ISA/210) and the Written Opinion of the International Searching Authority (Form PCT/ISA/237) issued on Feb. 15, 2012, by the European Patent Office in the International Application No. PCT/EP2011/071778. (9 pages).
An English Translation of the Office Action (Notice of Reasons for Rejection) issued on Apr. 30, 2014, by the Japan Patent Office in the Japanese Patent Application No. 2013-542496. (2 pages).
International Search Report (Form PCT/ISA/210) and the Written Opinion of the International Searching Authority(Form PCT/ISA/237) issued on Feb. 27, 2012, by the European Patent Office in the International Application No. PCT/EP2011/071781. (11 pages).
"Smart Cards; Card Application Toolkit (CAT) (Release 9)", ETSI TS 102 223, vol. SCP TEC, No. V9.2.0, (Oct. 1, 2010), pp. 1-209.
"IP Based Over-the Air Handset Configuration Management (IOTA-HCM), 3rd Generation Partnership Project 2 3GPP2", 3GPP2 C.S0040, Version 1.0, Jul. 18, 2003, pp. 1-68.
International Search Report (Form PCT/ISA/210) and the Written Opinion of the International Searching Authority (Form PCT/ISA/237) issued on Feb. 22, 2012, by the European Patent Office in the International Application No. PCT/EP2011/071675. (12 pages).
International Search Report (Form PCT/ISA/210) and the Written Opinion of the International Searching Authority (Form PCT/ISA/237) issued on Apr. 4, 2012, by the European Patent Office in the International Application No. PCT/EP2011/071731. (12 pages).
"3rd Generation Partnership Project; Technical Specification Group Services and System Aspects; Service aspects; Service principles (Release 11)", 3GPP TS 22.101 V11.0.0 (Sep. 2010), pp. 1-60.
International Search Report (Form PCT/ISA/210) and the Written Opinion of the International Searching Authority (Form PCT/ISA/237) issued on Apr. 16, 2012, by the European Patent Office in the International Application No. PCT/EP2011/071919. (7 pages).
International Search Report (Form PCT/ISA/210) and the Written Opinion of the International Searching Authority (Form PCT/ISA/237) issued on Feb. 27, 2012, by the European Patent Office in the International Application No. PCT/EP2011/071664. (8 pages).
Written Opinion of the International Preliminary Examining Authority (Form PCT/IPEA/408) issued on Dec. 13, 2012, by the European Patent Office in the International Application No. PCT/EP2011/071664. (5 pages).
Notification of Transmittal of the International Preliminary Report on Patentability (Forms PCT/IPEA/416 and PCT/IPEA/409) issued on Mar. 8, 2013, by the European Patent Office in the International Application No. PCT/EP2011/071664. (14 pages).
International Search Report (Form PCT/ISA/210) and the Written Opinion of the International Searching Authority (Form PCT/ISA/237) issued on Apr. 12, 2012, by the European Patent Office in the International Application No. PCT/EP2011/071695 and comments filed by the Applicant on May 31, 2012. (10 pages).
International Search Report (Form PCT/ISA/210) and the Written Opinion of the International Searching Authority (Form PCT/ISA/237) issued on Apr. 5, 2012, by the European Patent Office in the International Application No. PCT/EP2011/071785. (9 pages).
Vergnes et al., U.S. Appl. No. 13/992,103, entitle "Method for Exporting Data of a Javacard Application Stored in a UICC to a Host" filed Jun. 6, 2013.

(56) References Cited

OTHER PUBLICATIONS

Office Action issued by the U.S. Patent and Trademark Office in the U.S. Appl. No. 13/312,309, mailed Sep. 25, 2013, U.S. Patent and Trademark Office, Alexandria, VA. (13 pages).
Office Action issued by the U.S. Patent and Trademark Office in the U.S. Appl. No. 13/312,309, mailed Apr. 24, 2014, U.S. Patent and Trademark Office, Alexandria, VA. (13 pages).
International Search Report (PCT/ISA/210) issued on Feb. 22, 2012, by the European Patent Office as the International Searching Authority for International Application No. PCT/EP2011/071674.
Written Opinion (PCT/ISA/237) issued on Feb. 22, 2012, by the European Patent Office as the International Searching Authority for International Application No. PCT/EP2011/071674.
Madlmayr et al., "The benefit of using SIM application toolkit in the context of near field communication applications", International Conference on the Management of Mobile Business, IEEE, Jul. 2007, 8 pages.
Office Action (Notice of Reasons for Rejection) issued on Apr. 15, 2014, by the Japanese Patent Office in corresponding Japanese Patent Application No. 2013-542477.
3rd Generation Partnership Project; Technical Specification Group Services and System Aspects; 3G Security; Specification of the MILENAGE Algorithm Set: An example algorithm set for the 3GPP authentication and key generation functions f1, f1*, f2, f3, f4, f5 and f5*; Document 2: Algorithm Specification (Release 11) 3GPP TS 35.206 V11.0.0 (Sep. 2012) pp. 1-31.
"3$^{rd}$ Generation Partnership Project; Technical Specification Group Services and System Aspects; Feasibility Study on Remote Management of USIM Application on M2M Equipment (Release 8)", Global System for Mobile Communications, 3GPP TR 33.812, V1.0.0, Sep. 2008, pp. 1-80.
Office Action issued by the U.S. Patent and Trademark Office in the U.S. Appl. No. 13/991,823, mailed Jan. 5, 2015, U.S. Patent and Trademark Office, Alexandria, VA. (25 pages).
Office Action issued by the U.S. Patent and Trademark Office in the U.S. Appl. No. 13/991,846, mailed Feb. 10, 2015, U.S. Patent and Trademark Office, Alexandria, VA. (26 pages).
Office Action issued by the U.S. Patent and Trademark Office in the U.S. Appl. No. 13/992,065, mailed Dec. 18, 2014, U.S. Patent and Trademark Office, Alexandria, VA. (26 pages).
Notice of Allowance issued by the U.S. Patent and Trademark Office in the U.S. Appl. No. 13/991,752, mailed Jan. 21, 2015, U.S. Patent and Trademark Office, Alexandria, VA. (30 pages).
Office Action (Notice of Preliminary Rejection) issued on Feb. 25, 2015, by the Korean Patent Office in corresponding Korean Patent Application No. 10-2013-0717638, and an English Translation of the Office Action. (7 pages).
Office Action (Notice of Reasons for Rejection) issued on Aug. 19, 2014, by the Japan Patent Office in Japanese Patent Application No. 2013-542497, and an English Translation of the Office Action. (9 pages).
Office Action (Notice of Preliminary Rejection) issued on Jun. 27, 2014, by the Korean Intellectual Property Office in Korean Patent Application No. 10-2013-7017637, and an English Translation of the Office Action. (7 pages).
Office Action (Notice of Preliminary Rejection) issued on Aug. 19, 2014, by the Korean Intellectual Property Office in Korean Patent Application No. 10-2013-7016486, and an English Translation of the Office Action. (6 pages).
Office Action (Notice of Reasons for Rejection) issued on Aug. 5, 2014, by the Japan Patent Office in Japanese Patent Application No. 2013-542474, and an English Translation of the Office Action. (4 pages).
English translation of Office Action issued by the Korean Patent Office on Aug. 28, 2014 in corresponding Korean Application No. 10-2013-7016004. (3 pages).
English translation of Office Action issued by the Korean Patent Office on Apr. 16, 2015 in corresponding Korean Application No. 10-2013-7016004. (2 pages).
Office Action issued by the Russian Patent Office dated Dec. 29, 2014 in corresponding Russian Application No. 2013131034, and English translation of Office Action. (6 pages).
Office Action issued by the U.S. Patent and Trademark Office in the U.S. Appl. No. 13/991,766, mailed Mar. 17, 2015, U.S. Patent and Trademark Office, Alexandria, VA. (33 pages).
Office Action issued by the U.S. Patent and Trademark Office in the U.S. Appl. No. 13/992,039, mailed Mar. 17, 2015, U.S. Patent and Trademark Office, Alexandria, VA. (35 pages).
Office Action issued by the U.S. Patent and Trademark Office in the U.S. Appl. No. 13/991,689, mailed Jun. 18, 2015, U.S. Patent and Trademark Office, Alexandria, VA. (46 pages).
Office Action issued by the U.S. Patent and Trademark Office in the U.S. Appl. No. 13/991,823, mailed Jul. 13, 2015, U.S. Patent and Trademark Office, Alexandria, VA. (21 pages).
Office Action issued by the U.S. Patent and Trademark Office in the U.S. Appl. No. 13/991,912, mailed Jul. 23, 2015, U.S. Patent and Trademark Office, Alexandria, VA. (45 pages).
Office Action issued by the U.S. Patent and Trademark Office in the U.S. Appl. No. 13/992,103, mailed Jul. 13, 2015, U.S. Patent and Trademark Office, Alexandria, VA. (42 pages).
Office Action issued by the U.S. Patent and Trademark Office in the U.S. Appl. No. 13/992,065, mailed Jul. 30, 2015, U.S. Patent and Trademark Office, Alexandria, VA. (32 pages).
Office Action issued by the U.S. Patent and Trademark Office in the U.S. Appl. No. 13/991,766, mailed Oct. 1, 2015, U.S. Patent and Trademark Office, Alexandria, VA. (27 pages).
Office Action issued by the U.S. Patent and Trademark Office in the U.S. Appl. No. 13/992,039, mailed Oct. 1, 2015, U.S. Patent and Trademark Office, Alexandria, VA. (28 pages).
Office Action issued by the U.S. Patent and Trademark Office in the U.S. Appl. No. 13/991,846, mailed Oct. 15, 2015, U.S. Patent and Trademark Office, Alexandria, VA. (23 pages).
Office Action issued by the U.S. Patent and Trademark Office in the U.S. Patent Application No. 14/603,889, mailed Oct. 23, 2015, U.S. Patent and Trademark Office, Alexandria, VA. (36 pages).
Office Action issued by the Chinese Patent Office on Aug. 27, 2015 in corresponding Chinese Application No. 201180058683.0, and English language translation of Office Action (17 pages).
Office Action issued by the Chinese Patent Office on Aug. 19, 2015 in corresponding Chinese Application No. 201180058922.2, and English language translation of Office Action (16 pages).
Office Action issued by the Chinese Patent Office on Nov. 4, 2015 in corresponding Chinese Application No. 201180058688.3 (5 pages).
Office Action issued Nov. 17, 2015 by the Chinese Patent Office in corresponding Chinese Patent Application No. 201180058925.6 (10 pages).
Office Action issued by the U.S. Patent and Trademark Office in U.S. Appl. No. 13/992,103, mailed Nov. 25, 2015, U.S. Patent and Trademark Office, Alexandria, VA (22 pages).

\* cited by examiner

METHOD FOR DOWNLOADING A SUBSCRIPTION IN AN UICC EMBEDDED IN A TERMINAL

This disclosure is a national phase of PCT/EP2011/071674, filed Dec. 2, 2011, a continuation of U.S. application Ser. No. 13/312,309, filed Dec. 6, 2011, and claims priority to European Application No. 10306359.0, filed Dec. 6, 2010, the disclosures of which are hereby incorporated by reference.

The present invention concerns a method for downloading a subscription in an UICC (Universal Integrated Circuit Card) embedded in a terminal for example a mobile terminal (mobile phone) or a machine (for M2M (Machine to Machine) applications).

A UICC can be in the format of a smart card, or may be in any other format such as for example but not limited to a packaged chip as described in PCT/SE2008/050380, or any other format. It can be used in mobile terminals in GSM and UMTS networks for instance. The UICC ensures network authentication, integrity and security of all kinds of personal data.

In a GSM network, the UICC contains mainly a SIM application and in a UMTS network it is the USIM application. A UICC may contain several other applications, making it possible for the same smart card to give access to both GSM and UMTS networks, and also provide storage of a phone book and other applications. It is also possible to access a GSM network using an USIM application and it is possible to access UMTS networks using a SIM application with mobile terminals prepared for this. With the UMTS release 5 and later stage network like LTE, a new application, the IP multimedia Services Identity Module (ISIM) is required for services in the IMS (IP Multimedia Subsystem). The telephone book is a separate application and not part of either subscription information module.

In a CDMA network, the UICC contains a CSIM application, in addition to 3GPP USIM and SIM applications. A card with all three features is called a removable user identity card, or R-UIM. Thus, the R-UIM card can be inserted into CDMA, GSM, or UMTS handsets, and will work in all three cases.

In 2G networks, the SIM card and SIM application were bound together, so that "SIM card" could mean the physical card, or any physical card with the SIM application.

The UICC smart card consists of a CPU, ROM, RAM, EEPROM and I/O circuits. Early versions consisted of the whole full-size (85×54 mm, ISO/IEC 7810 ID-1) smart card. Soon the race for smaller telephones called for a smaller version of the card.

Since the card slot is standardized, a subscriber can easily move their wireless account and phone number from one handset to another. This will also transfer their phone book and text messages. Similarly, usually a subscriber can change carriers by inserting a new carrier's UICC card into their existing handset. However, it is not always possible because some carriers (e.g. in U.S.) SIM-LOCK the phones that they sell, thus preventing competitor carriers' cards being used.

The integration of the ETSI framework and the Application management framework of Global Platform is standardized in the UICC configuration.

UICCs are standardized by 3GPP and ETSI.

A UICC can normally be removed from a mobile terminal, for example when the user wants to change his mobile terminal. After having inserted his UICC in his new terminal, the user will still have access to his applications, contacts and credentials (network operator). It is also known to solder or weld the UICC in a terminal, in order to get it dependent of this terminal. This is done in M2M (Machine to Machine) applications. The same objective is reached when a chip (a secure element) containing the SIM or USIM applications and files is contained in the terminal. The chip is for example soldered to the mother-board of the terminal or machine and constitutes an e-UICC.

The present invention applies to such soldered UICCs (e-UICCs) or to such chips containing the same applications than the chips comprised in UICCs. A parallel can be done for UICCs that are not totally linked to devices but that are removable with difficulty because they are not intended to be removed, located in terminals that are distant or deeply integrated in machines. A special form factor of the UICC (very small for example and therefore not easy to handle) can also be a reason to consider it as in fact integrated in a terminal. The same applies when a UICC is integrated in a machine that is not intended to be opened.

In the next description, welded UICCs or chips containing or designed to contain the same applications than UICCs will generally be called embedded UICCs or embedded secure elements (in contrast to removable UICCs or removable secure elements). This will also apply to UICCs or secure elements that are removable with difficulty.

The present invention concerns embedded UICCs (not removable).

In a first embodiment, the invention is about a method using NFC to select and download an embedded (U)SIM application (or generally speaking a complete UICC application) to a terminal comprising such an embedded secure UICC. The terminal is for example a mobile phone.

In a second embodiment, the invention is about a method using a barcode for identifying a (U)SIM application (or generally speaking a complete UICC application) to be downloaded to a terminal able to take a photograph of this barcode.

As already explained in the introduction, in the future, when there are soft SIMs or embedded SIMs inside devices, it will be necessary to select the appropriate subscription information to download to the device. The user experience could be improved by giving a single-use NFC tag identifying the subscription for the device to download.

Said otherwise, in a world where the subscription information is no longer stored in a secure removable format such as today's UICC and instead stored as a "soft SIM" or soldered secure element (e.g. a VQFN8/DFN8 secure element) then there is a need to select the correct subscription to download to the device.

The invention proposes a method for downloading a subscription in an UICC embedded in a terminal, this method consisting in:
- transferring an ICCID to the terminal;
- sending the ICCID over an IP link to a secure vault;
- selecting in the secure vault a subscription corresponding to the ICCID;
- transmitting the subscription to the terminal over the IP link;
- storing the subscription in the terminal.

The ICCID is preferably transferred along with a ICCID's secret activation code and the secure vault verifies the pairing of the ICCID and the secret activation code before transmitting the subscription to the terminal.

In a first embodiment, the ICCID is contained in a token and the ICCID is transferred to the terminal via NFC.

The token can be constituted by a NFC tag.

In a second embodiment, the ICCID is contained in a barcode to be photographed by the terminal.

According to the first embodiment of the present invention, a NFC terminal is used.

The download of the subscription could be done through the user interface or in a push way. However, for terminals that are unlocked, a need is present (for MNO processes with legacy flows) to have a physical tag/NFC card to distribute similar to today's physical SIM card. This tag would contain a reference to the ICCID (with a security activation code known to the provisioning system and linked to an individual ICCID). Once the ICCID is submitted to the provisioning system with the correct activation code, the remote provisioning service can begin the secure transfer of the correct software (SIM profile, subscription information) for the embedded secure element.

If for example, a user has a pre-activated device X and want to buy a subscription from operator A, the flow would be as follows:

Device X is touched against NFC token Y. The token contains the ICCID and preferably also the ICCID's activation code. Device X reads the ICCID from token Y as well as (preferably) the ICCID's secret activation code which is unique (this code prevents brute-force guessing of ICCID requests to the provisioning centre).

Device X sends this ICCID over an IP link to a secure vault. The secure vault verifies the ICCID/secret activation code pairing and if valid it securely packages, encrypts and signs the entire personalisation script for the related embedded UICC (containing SIM application, USIM application, ISIM application, CSIM application, any other network authentication applications as well as any SIM application Toolkit applications and Operating System Customisations/mechanisms related to that specific MNO) as well as the relevant subscription information such as the IMSI, K, Opc, IMPU and algorithm constants. The contents of the profile would be known to the secure vault using the ICCID range or alternatively a profile code could be submitted to the system.

The secure vault transmits the above personalisation script to device X encrypted for Device X's embedded secure element (and with an anti-replay counter mechanism included) over the IP link.

Device X (including its embedded secure element) decrypts and runs the personalisation script thus provisioning the subscription onto the embedded secure element.

Device X may now access the radio network using the subscription.

In a second embodiment, the ICCID is contained in a barcode to be photographed by the terminal. After having taken a picture of the barcode, the terminal sends it to the secure vault. The secure vault then compares the received barcode with pre-registered barcodes or decodes the barcode for retrieving the ICCID. The same process as mentioned above is then undertaken.

The invention allows selection of subscription as well as profile variant remotely and makes the user experience very easy.

The invention claimed is:

1. Method for downloading a subscription in an UICC embedded in a terminal, said method comprising:
   transferring an integrated circuit card identifier (ICCID) to said terminal;
   sending said ICCID over an IP link to a secure vault;
   selecting in said secure vault a subscription corresponding to said ICCID;
   transmitting said subscription to said terminal over said IP link; and
   storing said subscription in said terminal.

2. Method for downloading a subscription in an UICC embedded in a terminal, said method comprising:
   transferring an integrated circuit card identifier (ICCID) to said terminal;
   sending said ICCID over an IP link to a secure vault;
   selecting in said secure vault a subscription corresponding to said ICCID;
   transmitting said subscription to said terminal over said IP link; and
   storing said subscription in said terminal, wherein
   said ICCID is transferred along with an ICCID's secret activation code, and wherein said secure vault verifies the pairing of the ICCID and the secret activation code before transmitting said subscription to said terminal.

3. Method for downloading a subscription in an UICC embedded in a terminal, said method comprising:
   transferring an integrated circuit card identifier (ICCID) to said terminal;
   sending said ICCID over an IP link to a secure vault;
   selecting in said secure vault a subscription corresponding to said ICCID;
   transmitting said subscription to said terminal over said IP link; and
   storing said subscription in said terminal, wherein
   said ICCID is contained in a token and said ICCID is transferred to said terminal via near field communication (NFC).

4. Method according to claim 3, wherein said token is an NFC tag.

5. Method for downloading a subscription in an UICC embedded in a terminal, said method comprising:
   transferring an integrated circuit card identifier (ICCID) to said terminal;
   sending said ICCID over an IP link to a secure vault;
   selecting in said secure vault a subscription corresponding to said ICCID;
   transmitting said subscription to said terminal over said IP link; and
   storing said subscription in said terminal, wherein
   said ICCID is contained in a barcode to be photographed by said terminal.

* * * * *